United States Patent [19]

Cornell

[11] 4,022,314
[45] May 10, 1977

[54] SAWMILL APPARATUS

[76] Inventor: Cyrus J. Cornell, P.O. Box 18, Laceyville, Pa. 18623

[22] Filed: Dec. 1, 1975

[21] Appl. No.: 636,532

Related U.S. Application Data

[62] Division of Ser. No. 582,747, June 2, 1975.

[52] U.S. Cl. .......................... 198/413; 214/1 QG; 83/418; 83/705
[51] Int. Cl.² .................................... B65G 47/24
[58] Field of Search .................. 198/283–286, 198/413; 214/1 S, 1 Q, 1 QE, 1 QG; 83/78, 161, 418, 421, 704, 705, 338, 339

[56] References Cited

UNITED STATES PATENTS

| 1,928,395 | 9/1933 | Schreck | 198/286 |
| 3,880,036 | 4/1975 | Yokoyama | 83/421 |

Primary Examiner—Evon C. Blunk
Assistant Examiner—Joseph E. Valenza
Attorney, Agent, or Firm—Richard G. Stephens

[57] ABSTRACT

An improved assembly for aligning elongate pieces of wood such as cants on a roller conveyor and for rotating them about their lengthwise axes includes a plurality of kicker arms extending radially from a rotatable shaft up between the rollers of the conveyor, so that rotation of the shaft allows the kicker arms to press a cant against a guide plate extending along one side of the conveyor surface. A plurality of pusher arms slidingly mounted on the kicker arms and extendable to engage a lower corner of the cant to rotate the same.

6 Claims, 5 Drawing Figures

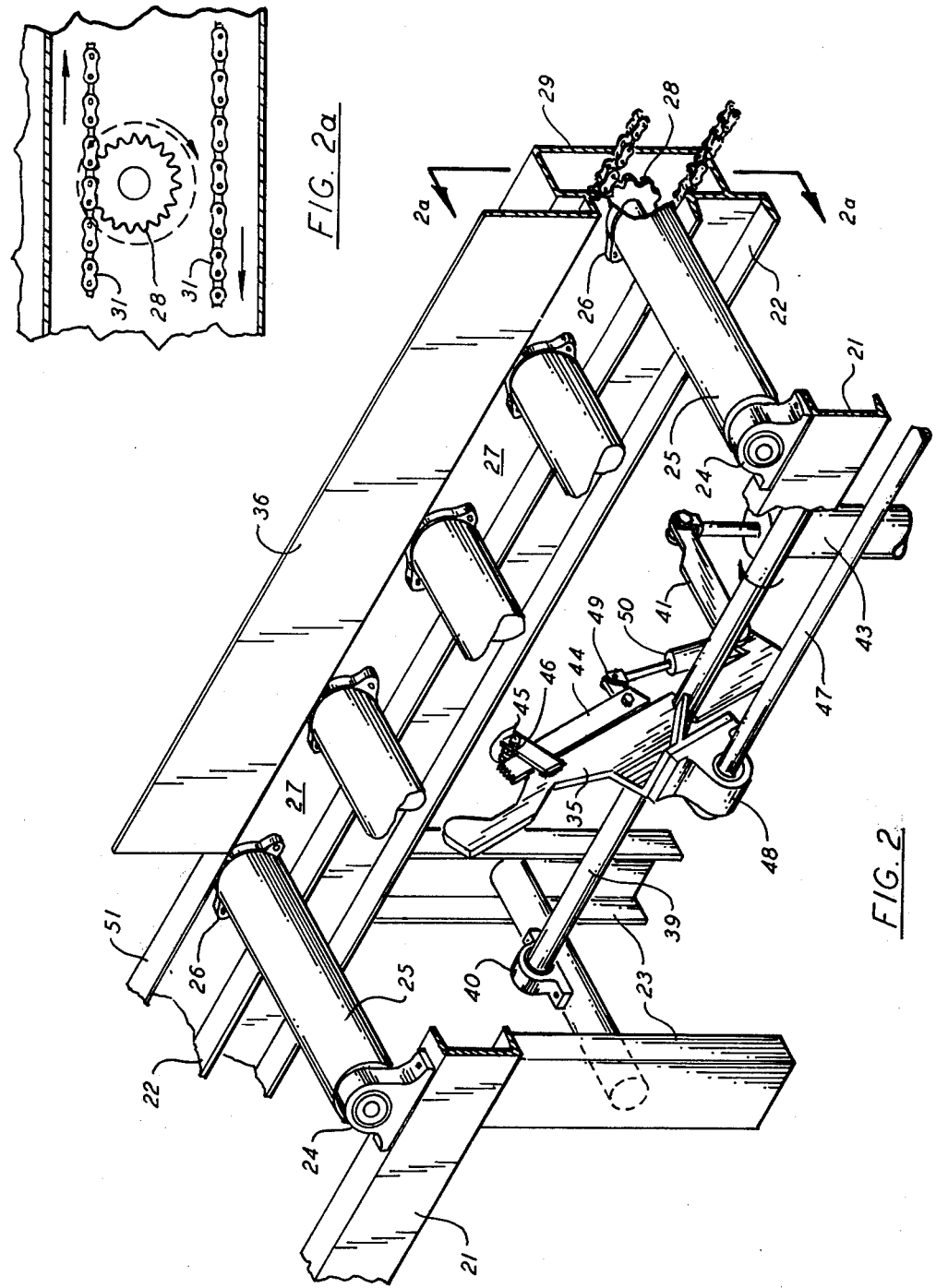

SAWMILL APPARATUS

CROSS-REFERENCE TO RELATED APPLICATIONS

This application is a division of my copending Application Ser. No. 582,747 filed June 2, 1975 and is directed to an improved cant aligning and rotating assembly disclosed therein. While the improved cant turning arrangement disclosed and claimed herein will be described in connection with the single-operator cross-cut-resaw sawmill assembly shown in my copending application, it will be evident that it is useful in a wide variety of different wood-processing applications where elongated cants, slabs or other pieces of generally-rectangular cross-section must be or are desired to be rotated in approximately 90° increments.

A cant is a piece of wood of generally rectangular cross-section from the heart of a tree which remains after higher-quality slabs have been rough-sawn from the outer layers of a tree. Most cants have a 4-inch or 6-inch thickness and widths typically varying between 6 and 10 inches. A large number of cants are commonly cut up to make wood pallets for use in material-handling. A pallet typically comprises three or four "stringer" boards having a given cross-section (such as 2 × 4 inches) which are spaced apart and interconnected on their top edges, or top and bottom edges, by deck boards having a different cross-section (such as 1 × 4 inches). The lengths of stringer boards and the deck boards are typically 3 to 4 feet, in various standard lengths, such as 32, 36, 40 or 48 inches. In numerous sawmills equipped to produce pallet stock, successive cants having standard thicknesses, such as 4 or 6 inches, and numerous different widths and lengths, are first cut into standard lengths such as 3 or 4 feet, using a "trim and cut to length" cross-cut saw. The cross-cut saw ordinarily includes an in-feed conveyor comprising operator-controllable powered rolls, an out-feed conveyor of a generally similar nature, and a powered reciprocable circular saw-blade situated at the adjacent ends of the two conveyors, which the operator may cause to move perpendicularly to the lengths of the conveyors to saw a cant in two. In the prior art, cants usually have been placed manually on the in-feed table by two workers, or by another conveyor device. By operating a selected one of various push-button switches, the operator of the cross-cut saw may cause a selected one of a plurality of hydraulically or pneumatically-operated stops to extend partly across the out-feed table. After a cant has been placed atop the in-feed conveyor, the operator ordinarily extends a stop which is located a very short distance (e.g. 1 inch) beyond the saw blade, he controls the in-feed conveyor to advance the cant until its leading edge strikes the stop, and then he causes the blade of the cross-cut saw to reciprocate perpendicularly to the conveyor direction, to saw through the cant near its leading end, thereby to square the leading end of the cant. Then a second stop located a desired distance, say 4 feet, beyond the saw blade is instead extended, the cant advanced until the now squared leading end strikes the second stop, and then the rotating circular saw is again reciprocated to saw through the cant, thereby to provide a cut length of four feet. Such a process then may be repeated, until as many four-foot lengths as can be provided from the cant have been cut. As each standard or measured length is cut from the cant, it is propelled forwardly away from the saw on the out-feed table or conveyor, which may be arranged to convey the standard length pieces to another conveyor. The other conveyor conveys the standard length pieces to the in-feed conveyor of a multiple-blade ripping saw, dumping them one at a time on to the in-feed conveyor table of the ripping saw. The ripping saw, or "resaw", is operated by a second operator, and may comprise a single gang of saw blades spaced to cut stringer boards or instead spaced to cut deck boards. Some prior resaws include double bays with gangs of blades for both stringers and deck boards, so that the resaw operator can manually push a board to one side or the other of the resaw, to determine whether it will be cut into deck boards or into stringers.

It is of great importance that as many as possible usable pieces for pallets be obtained from a given load of cants. Because of its size, and the places where it may contain various defects such as knots, a given cant may be used much more efficiently if sawed into stringer boards, while another cant might be better suited to make pallet deck boards. For example, a knot of 1 inch diameter which extended through the middle of a 2 × 4 stringer would not appreciably weaken the stringer, but the same knot would make a 1 × 4 deck board worthlessly weak if it extended across the width of the deck board. Loads of cants are delivered to the sawyer unsorted as between the types of its defects such as knots, and sorting the cants into the two types would tend to require extensive manual labor. To saw in the best direction with a resaw through cut pieces of a cant having knots will be seen to require that various of the cants or pieces thereof be rotated at least 90°. For thorough inspection of a cant, it is beneficial if an operator can view all four sides, so that further rotation, through several increments of ninety degrees becomes desirable. An important object of the present invention is to provide means which will allow an operator to rapidly and selectively rotate a cant or like piece of wood of generally-rectangular cross-section through one or more angular increments of ninety degrees, so that he may inspect it rapidly and conveniently. While some prior trimming and cut-to-length cross-cut saw assemblies used in sawmills enable an operator to readily cut cants into pieces of varying lengths, so that an operator can readily cut successive pieces in either stringer length or deckboard length and thus use a cant efficiently in some respects, the cut pieces then would have to be manually sorted, and then fed either to a multiple-blade ripping saw which is set up to cut stringer boards or to a different saw set up to cut deck boards. If a double-bay saw is used, an operator must stand in front of the saw to sort the cut pieces, feeding them to the proper bay of the resaw. Despite various safeguards which are built into most resaws, the job of feeding cut pieces of cants into one bay or the other of a double-bay resaw tends to be a dangerous one, as such saws frequently discharge pieces of wood at lethal velocities. One object of the present invention is to provide improved sawmill apparatus wherein an operator need not manually rotate cants or cut pieces of cants in order to feed them with a desired orientation to some further processing apparatus such as a resaw.

Aside from the danger of sorting cut pieces "on-line" and feeding them into a resaw, any second inspection of pieces, after they have been cut to length, in order to determine whether they should become stringers or deck boards, represents wasted labor. Furthermore, a person who is sorting cut pieces and feeding them to one or two resaws may not know whether the person who previously cut a piece to length intended the piece to be sawed into stringers or instead into deck boards, since both pieces may be the same or about the same length. Both the wasted labor of double inspection and wasted wood resulting from differing operator decisions may be eliminated by the invention claimed in the copending application, wherein a single operator can control both cutting to length and subsequent ripping into stringers or deck boards, and provision of such apparatus is a primary object of the invention.

Various sawing operations require or desirably include means for rotating or turning cants about their lengthwise axis. One prior art cant turner includes a plurality of Y-shaped yokes carrying sprockets and loops of roller chain driven by individual motors and gearboxes. To rotate a cant the yokes are moved upwardly between various rollers of an in-feed table to lift the cant above the rollers, and then the roller chain loops are rotated. Such an arrangement is complex, expensive, and subject to wear, and has limited operating speed. Another object of the present invention is to provide a simple, reliable, less expensive and faster apparatus for turning cants. The mentioned prior art cant turner is also disadvantageous in that it tends to require precise operator control and attention or timing, since the amount which a cant is rotated depends upon the time period during which the operator operates the turning motors. In the absence of precise timing he may rotate the cant to a position such that a corner of the cant rather than a flat surface will engage the conveyor rolls when the yokes are lowered to relower the cant onto the rolls, and the cant may fall to a different angle than that intended. Such timing errors can be obviated, of course, by driving the turning motors slowly, but then rotation of the cant occurs undesirably slowly. Thus another object of the present invention is to provide an improved cant turning mechanism which does not require operator timing, and which will rotate a cant in discrete 90° increments of rotation rapidly and accurately.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

BRIEF DESCRIPTION OF THE DRAWING

For a fuller understanding of the nature and objects of the invention reference should be had to the following detailed description taken in connection with the accompanying drawings, in which:

FIG. 2 is a perspective view of a portion of an in-feed conveyor and portions of the improved cant aligning and turning apparatus, with various portions cut away and other portions shown in phantom to afford a better view of portions of the invention.

FIG. 2a is a section view taken at lines 2a—2a in FIG. 2.

DETAILED DESCRIPTION

Figure 1:
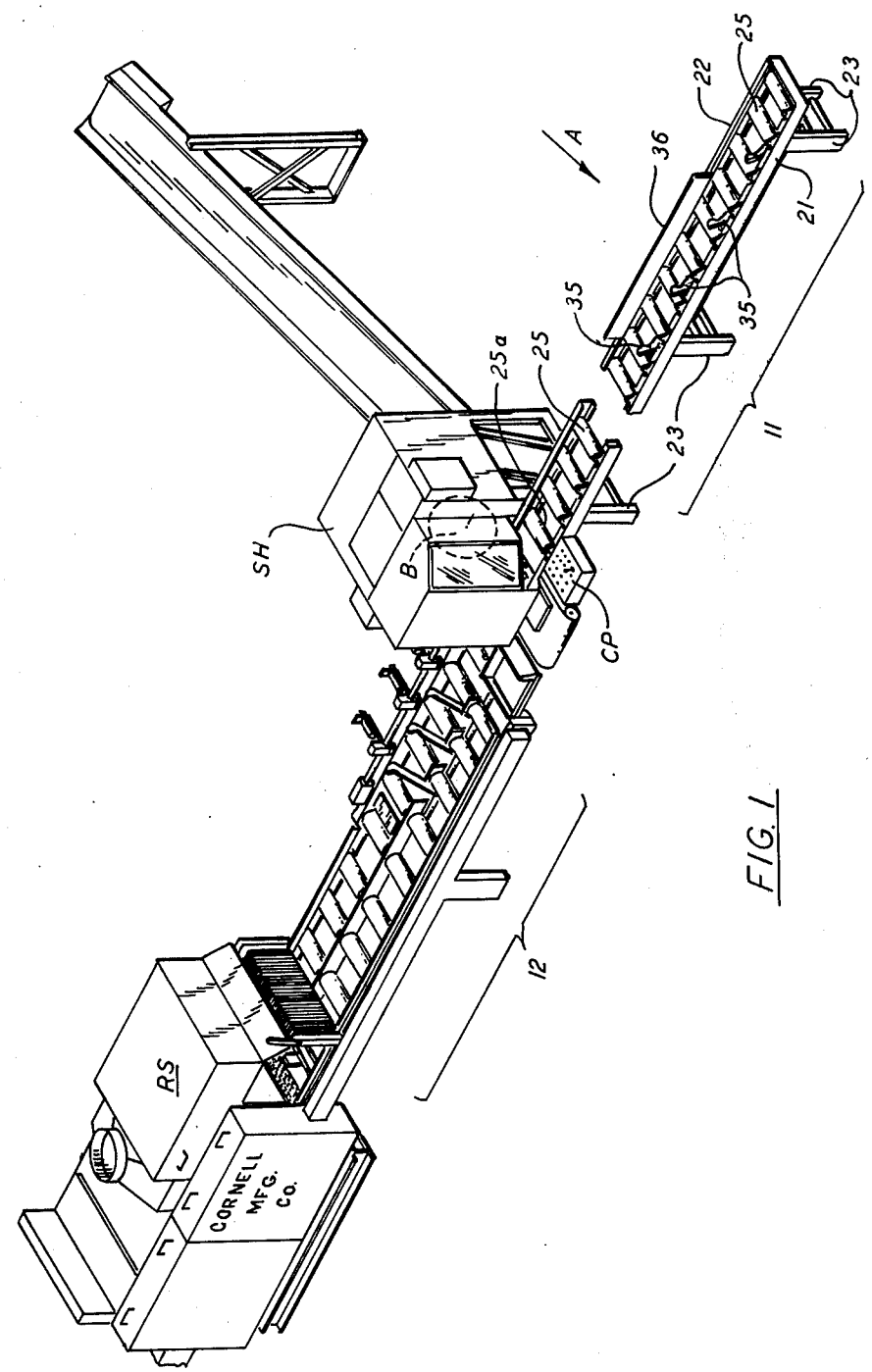
FIG. 1 is a perspective view of an exemplary form of sawing assembly with a portion of the in-feed conveyor cut away for drafting convenience.

In FIG. 1 an assembly which incorporates the present invention is shown as including an in-feed roller conveyor section 11, an out-feed roller conveyor section 12, a powered, reciprocable, circular saw contained within a housing SH, and a double-bay gang circular saw assembly RS. The operator stands adjacent a control panel CP, and operates switches thereon to control the entire assembly. Cants are fed sidewise one at a time onto in-feed conveyor 11, in the direction shown by arrow A in FIG. 1, preferably from any one of a number of known conveyor systems, such as a live deck equipped with pin stops (i.e., a conveyor with powered rolls and stops which the operator may lower by remote control), or a cockscomb feeding device known in the art.

As seen in FIGS. 1 and 2, the in-feed conveyor comprises a pair of parallel spaced-apart channel members 21,22 supported above the floor on legs 23,23. A portion of outer channel 21 is cut away in FIG. 2. A plurality of pillow-block bearings 24,24 (FIG. 2) mounted atop channel 21 rotatably support one end of each of a plurality of rolls 25,25 several of which are shown in cutaway phantom in FIG. 2. The inner end of each roll 25 includes a shaft journalled in and extending through a respective bearing 26 mounted on plate 27, with a sprocket 28 on the end of each roller shaft, located within a sprocket housing 29. The upper course of roller chain 31 engages each sprocket 28, as illustrated in FIG. 2a, and thus the driving of chain 31 rotates all the in-feed conveyor rollers 25 at the same speed. The axes of rotation of all of the in-feed rollers 25 (except the one adjacent the saw blade and indicated at 25a in FIG. 1) are slightly canted at a small angle (e.g. 5°) from the normal to the longitudinal direction of channels 21,22, so that the end of each such roll near channel 21 leads, or is slightly forward of the other roller end. Due to such angular canting of the rolls, a cant lying atop rollers of the in-feed conveyor will be urged with a slight lateral component toward the channel 22 side of the in-feed conveyor as rotation of the rollers 25 advances the cant generally longitudinally along the rollers toward the saw assembly at SH, maintaining the cant against guide rail 51.

Figure 3A:
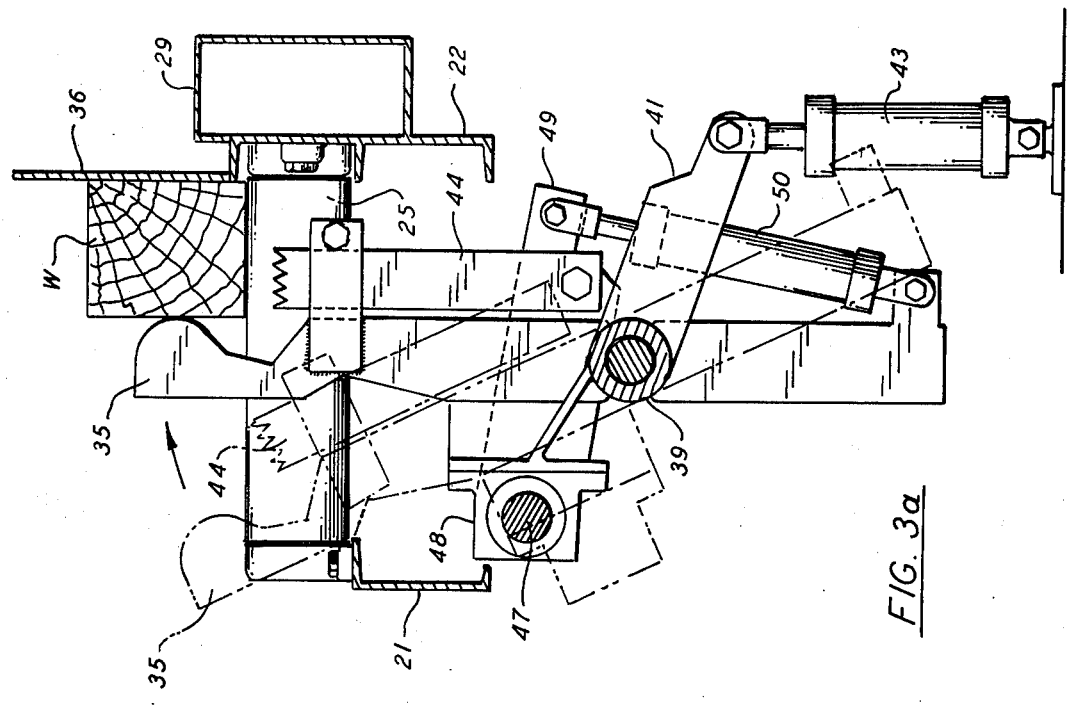
FIGS. 3a and 3b are end views of the apparatus of FIG. 2 showing the parts thereof in two different operating positions.

While it has been stated that cants are placed on the in-feed table 11 in the direction of arrow A in FIG. 1, cants in fact may be dropped onto the rollers of the in-feed conveyor from either side of the conveyor, or fed endwise onto the end of the in-feed conveyor. Such endwise feeding may be preferred, for example, where cants are planed prior to being cut to length, which is sometimes desired. Thus it will be apparent that the invention can be used in association with an outfeed conveyor in lieu of an in-feed conveyor. When dropped on the in-feed conveyor, a cant ordinarily will not be precisely aligned in the longitudinal direction of the conveyor. By operation of a plurality of kicker arms 35,35 the cant may be slid laterally on the conveyor, to press one side of the cant against guide plate 36. As shown in FIG. 3, the in-feed conveyor includes a plurality of kicker arms which extend up between various of the rolls of the in-feed conveyor. In FIG. 2 and FIG. 3a one kicker arm 35 is shown carried on a shaft 39 rotatably journalled as at 40 (FIG. 2) beneath the rollers of the in-feed conveyor. In FIG. 3a a kicker arm assembly is shown in dashed lines at the normal or rest position it will have as a cant is dropped on the in-feed conveyor, and shown in solid lines at its operated position as it urges a cant W against guide plate 36 on the inner side of the conveyor. Arm 41 extending radially from shaft 39 is engaged by ram 43 mounted on the floor below the conveyor. Thus as ram 43 is retracted to rotate shaft 39 clockwise in FIG. 3a, the upper end of kicker arm 35 moves toward guide plate 36, urging the cant against the guide plate. Each of the other kicker arms 35 are carried similarly on shaft 39. Thus a cant placed on the in-feed table 11 may be forced against guide plate 36 by the kicker arms 35,35, and then as rolls 25 are rotated to move the cant toward the cross-cut saw assembly, the angular canting of the rolls maintains the cant against guide rail 51 which extends longitudinally from guide plate 36 at the same lateral position.

Figure 3B:
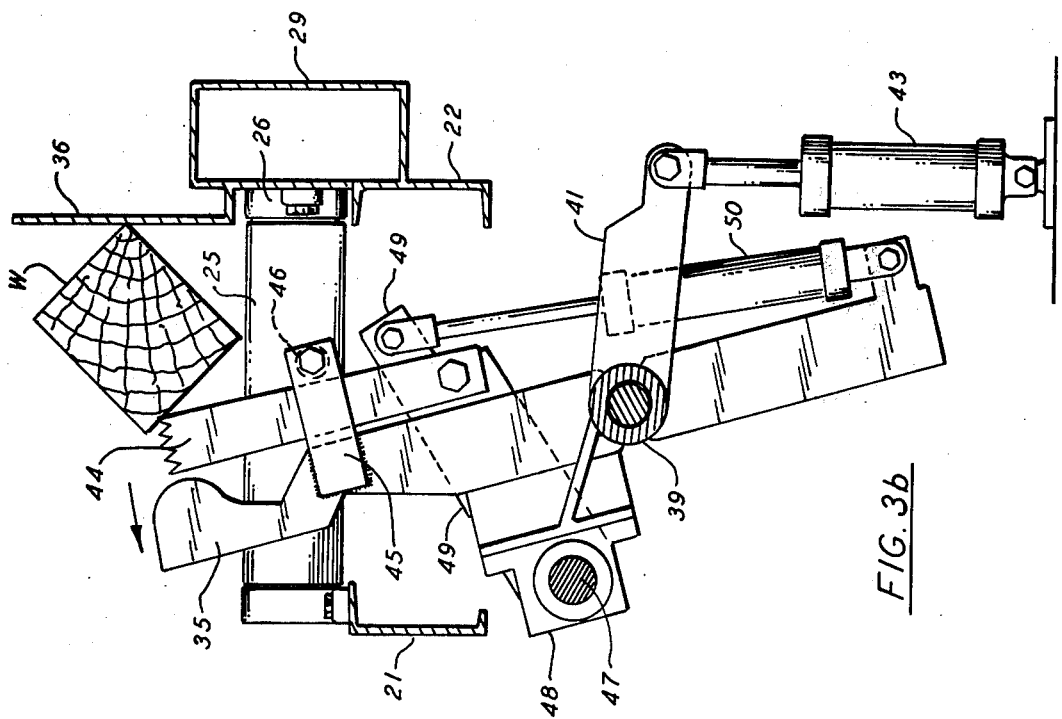

The arrangement and use of kicker arms as thus far described is by no means novel. However, in accordance with the preferred form of the present invention, a respective reciprocable pusher bar 44 is bodily carried on several or all of the kicker arms 35, and a ram 50 for operating the pusher bars is bodily carried on one of the kicker arms 35 of the in-feed conveyor assembly. In FIG. 2 pusher bar 44 is shown slidingly retained on kicker arm 35 by a pair of welded tabs 45,45 on opposite sides of the pusher bar, and a roller 46. Shaft 47 is journalled in pillow-block bearings 48 carried on each of the kicker arms 35,35. A plurality of arms 49,49 extend radially from shaft 47, each engaging the lower end of a respective pusher bar 44. Extensible ram 50 carried on one of the kicker arms engages the radial arm 49 connected to the pusher bar carried on that kicker arm. As ram 50 is extended, it rotates shaft 47 counterclockwise as viewed in FIG. 3a or FIG. 3b, raising each of the pusher bars 44. If ram 50 is extended from its retracted position as the kicker arms 35 are backed away from the cant, the extension of the serrated or roughened upper end of each pusher bar 44 will apply a torque to the lower outer corner of the cant, thereby rotating the cant 90°. Each pusher bar 44 moves substantially parallel to the kicker arm on which it is mounted. In FIG. 3b the assembly is shown in an intermediate position as a cant W is being rotated 90°. Ram 43 is being extended to rotate the kicker bars 35 and the pusher bars 44 counterclockwise, while ram 50 is simultaneously being extended to also move the pusher bars upwardly as they swing counterclockwise with the kicker arms 35. The serrated upper ends of pusher bars 44,44, thereby apply a clockwise moment to the cant W, rotating the cant. The clockwise moment will be seen to be caused by each of two effects, (1) an upward push on portions of the lower face of the cant which are laterally displaced from the lateral position of the center-of-gravity of the cant, since the serrated ends engage the cant nearer the side away from the guide plate, and (2) the clockwise moment caused by the serrated ends frictionally urging the initially lower face of the cant leftwardly in FIGS. 3a and 3b. Upon continued motion past the condition shown in FIG. 3b, it will be apparent that the upper end of the pusher bar will clear the corner of the cant, leaving the cant turned 90° from its prior position. The simultaneous actuation of rams 43 and 50 is accomplished by simple electrical switching. One pushbutton switch on control panel CP (FIG. 1) may operate a solenoid valve (not shown) to extend ram 43 to rotate kicker arms 35, and another such switch may be connected to operate a different solenoid valve to extend ram 50 to extend pusher bars 44, and then a 90° rotation of the cant will occur if the operator merely pushes both switches simultaneously. It will be apparent that, if desired, one such switch may be wired to actuate both the kicker arms and the pusher bars. Because the electrical and hydraulic or pneumatic connections for operating the rams shown in this disclosure may be completely straightforward and well within the skill of the art, these connections have not been shown. It will be seen that by repeated simultaneous operation of rams 43 and 50, the operator may rapidly rotate a cant to any one of its four angular orientations, noting the presence of defects, such as knots, as he does so, and then he may select a desired final angular orientation depending upon the way, for example, in which one or more knots extend through the cant, or depending upon the cross-sectional dimensions of the cant, so that the wood may be used more efficiently with less waste, or depending upon the requirements of a particular order then being processed.

The cant turning arrangement shown will be seen to be simple and reliable, inexpensive to fabricate, and rapid in operation. Unlike the previously mentioned prior art cant turner, it requires no plurality of electric motors and gear boxes, nor the use of roller chains, which are subject to appreciable wear. Also, the cant turner of the present invention does not require that the operator control the length of a time period during which rotation occurs. Therefore, operator action cannot result in a cant being turned more or less than 90° by reason of a timing error, and rotation in 90° increments can occur very rapidly.

After he has rotated the cant to put the desired side "up", the operator feeds the cant forward, using a joystick JS on control panel CP to control the speed of a motor which drives the rolls of the in-feed conveyor and certain rolls of the outfeed conveyor as is explained in detail in my copending application, first moving a cant to the cross-cut assembly SH to cut it in several pieces, and then moving the cut pieces via outfeed conveyor 12 to the resaw assembly RS.

The rams may be either a hydraulic or a pneumatic type, and even electric motors with rotary-to-linear motion-converting mechanisms conceivably could be substituted, although I much prefer the use of simple expansible-chamber rams.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. Apparatus for transporting an elongated piece of wood of generally rectangular cross-section and rotating said piece about its lengthwise axis, comprising, in combination: a plurality of cylindrical rolls; support means for supporting said rolls spaced apart in a row extending in a first direction and for rotatably journalling the ends of said rolls with the upper edges of said rolls substantially located in a common plane; a first shaft journalled at a level below said rolls and extending in said first direction parallel to said common plane; a plurality of first arms each extending generally radially from said first shaft upwardly between a respective pair of said rolls; guide means having a substantially vertical surface extending in said first direction above said plane adjacent one end of each of said rolls; a plurality of pusher arms each slidingly mounted on a respective one of said first arms; a second shaft extending in said first direction and journalled on a plurality of said first arms; a plurality of second arms each extending generally radially from said second shaft and being connected to a respective one of said pusher arms; means for rotating said first shaft; and an extensible ram means connected between one of said first arms and one of said second arms, where by extension of said ram means said pusher arms slide toward the outer ends of said first arms simultaneously with rotation of said first shaft to move said first arms away from said vertical surface.

2. Apparatus according to claim 1 wherein said plurality of rolls are journalled with their axes of rotation canted at an acute angle to said first direction.

3. In apparatus for selectively aligning a cant of generally rectangular cross-section on a roller conveyor which includes a first plurality of arms extending above the rolls of said conveyor and movable against a first vertical side of said cant to locate the second vertical side of said cant in a predetermined guide plane, and means for moving said arms of said first plurality toward and away from said guide plane, the combination of means for pushing against the lower side of said cant to apply a rotational moment to said cant, said means for pushing comprising a second plurality of arms slidingly mounted on respective ones of said arms of said first plurality and means for moving said arms of said second plurality along said arms of said first plurality as said arms of said first plurality are moved away from said first side wherein said means for moving said arms of said second plurality comprises a shaft rotatably carried on at least two of said arms of said first plurality, a third plurality of arms radially extending from said shaft, and a plurality of links connecting said arms of said third plurality to respective ones of said arms of said second plurality.

4. The combination of claim 3 which includes extensible and retractable ram means connected between one of said arms of said first plurality and one of said arms of said third plurality.

5. Apparatus according to claim 3 in which each of said arms of said first plurality is shaped so that it will engage a side of a cant resting on said rolls only at locations above a plane defined by the tops of said rolls.

6. Apparatus according to claim 3 wherein said rolls are journalled with their axes of rotation canted at an acute angle from a perpendicular to said guide plane, whereby rotation of said rolls will restore a cant moved away from said guide plane by said arms of said second plurality to a position aligned against said guide plane.

* * * * *